Jan. 9, 1968   C. L. BUXBAUM ETAL   3,363,087
CONTACTLESS TEMPERATURE CONTROLLER
Filed Dec. 26, 1963
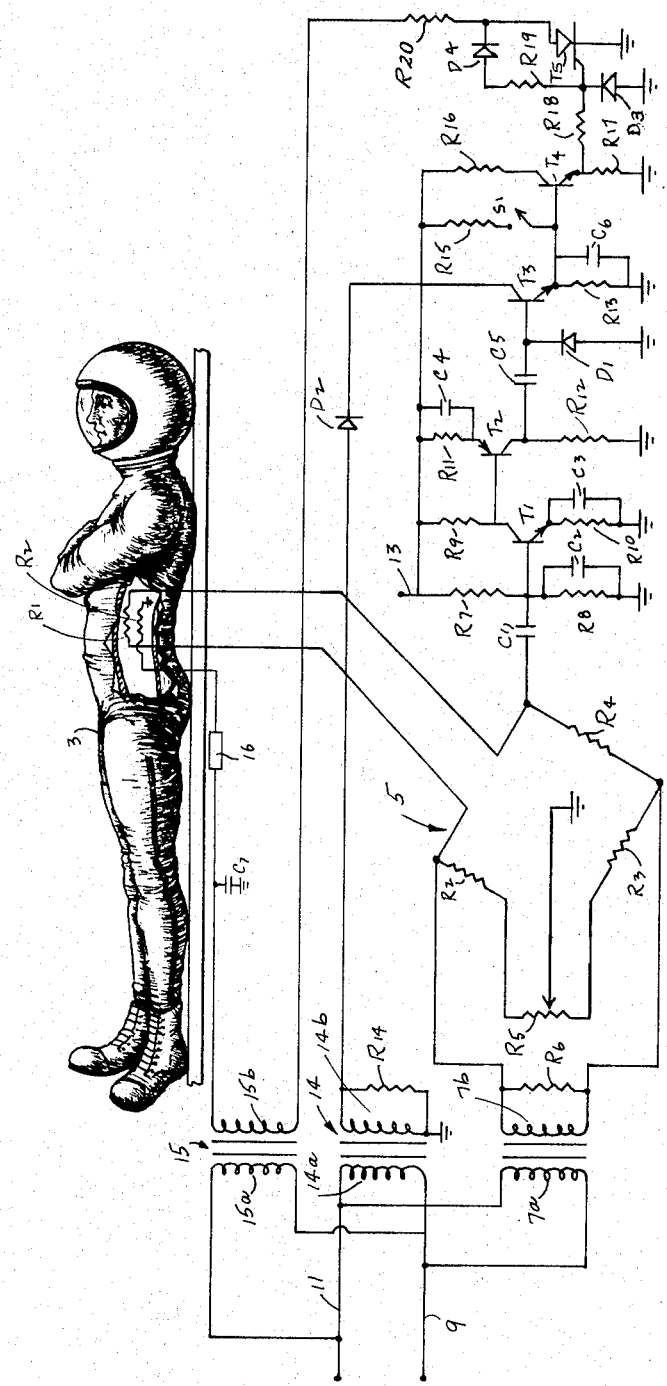
INVENTORS
Colman L. Buxbaum
Sylvester Allen
BY 3,363,087
CONTACTLESS TEMPERATURE CONTROLLER
Colman L. Buxbaum, Plainview, and Sylvester Allen, West Hempstead, N.Y., assignors, by mesne assignments, to the United States of America, as represented by the Secretary of the Navy
Filed Dec. 26, 1963, Ser. No. 333,774
1 Claim. (Cl. 219—201)

ABSTRACT OF THE DISCLOSURE

The subject invention relates to apparatus which is employed to determine with accuracy the effectiveness of various types of protective garments as insulators from extreme conditions of heat and cold.

---

The present invention relates to novel and improved apparatus for determining the effectiveness of various types of garments in resisting the transfer of heat energy from a simulated human body or manikin to or from the surrounding environment.

In the design of various types of protective clothing and apparel particularly those which are used in travel in space, it is often necessary to determine with accuracy the effectiveness of the suit or garment as an insulator from extreme variations in temperature. Although the heat insulating property of any garment is often important in its selection and use as a protective article of apparel from the elements, no known apparatus has heretofore been devised whereby the same can be accurately and scientifically evaluated.

It is therefore a principal object of the present invention to provide apparatus which can be employed to determine the effectiveness of various types of protective garments from the heat and cold.

Other objects and many of the attendant advantages of this invention will be readily appreciated as the same becomes better understood by reference to the following detailed description when considered in connection with the accompanying drawing wherein:

The figure is a diagrammatic view of a preferred embodiment of the present invention.

As illustrated in the figure of the drawing, the thermistor R-1 and the heater element R-2 are located adjacent one another within the manikin 3 at a suitable preselected point. The thermistor R-1, resistors R-2, R-3 and R-4 and the variable resistor R-5 are connected as shown to form a conventional Wheatstone Bridge circuit 5. The variable arm of resistor R-5 is connected to ground and as will be more apparent hereinafter provides means for balancing the bridge circuit at a preselected value of resistance of thermistor R-1. The primary winding 7-a of transformer 7 is energized by the 115 volt alternating current potential across conductors 9 and 11 and opposite terminals of its secondary winding 7-b are connected to the junction of resistor R-2 and thermistor R-1 and the junction of resistors R-3 and R-4. Resistor R-6 is preferably connected in parallel with the secondary winding of transformer 7 as shown.

The junction of thermistor R-1 and resistor R-4 of the bridge circuit is coupled to the base of transistor T-1 through condenser C-1. The base of transistor T-1 is connected to the positive 12 volt power supply line 13 through resistor R-7 and to ground through the parallel arrangement of resistor R-8 and condenser C-2. The collector-emitter circuit of transistor T-1 extends from the power supply line 13 through resistor R-9, through the transistor and through the parallel arrangement of resistor R-10 and condenser C-3 to ground. The collector of transistor T-1 is connected to the base of transistor T-2. The collector-emitter circuit of transistor T-2 extends from the power supply line 13 through the parallel arrangement of resistor R-11 and condenser C-4, through the transistor and through resistor R-12 to ground. The collector of transistor T-2 is coupled to the base of transistor T-3 through condenser C-5 and diode D-1. The collector emitter circuit of transistor T-3 extends from the ungrounded side of the secondary winding 14-b of transformer 14 through diode D-2, through the transistor and through the parallel arrangement of resistor R-13 and condenser C-6 to ground. Resistor R-14 is preferably connected in parallel with the secondary winding of transformer 14 as shown. The primary winding 14-a of transformer 14 is energized by the 115 volt alternating current potential across conductors 9 and 11.

The emitter of transistor T-3 is connected to the base of transistor T-4. The base of transistor T-4 is also connected to the power supply line 13 through the manually operable switch S-1 and resistor R-15. The collector-emitter circuit of transistor T-4 extends from the power supply line 13 through resistor R-16, through the transistor, and through resistor R-17 to ground. The emitter of transistor T-4 is connected to the gate of the silicon control rectifier T-5 through resistor R-18. The gate of the silicon control rectifier T-15 is connected to ground through diode D-3 and to its anode through resistor R-19 and diode D-4. The anode cathode circuit of the silicon control rectifier T-5 extends from one terminal of the secondary winding 15-b of transformer 15 through resistor R-20 and through the rectifier T-5 to ground. The other terminal of the secondary winding of transformer 15 is connected to ground through condenser C-7 and through the ammeter recorder or the like 16 and heater resistor element R-2 within the manikin. The primary winding 15-a of transformer 15 is energized by the 115 volt alternating current potential across conductors 9 and 11.

In operation, the variable arm of resistor R-5 is first set such that the bridge circuit 5 is balanced when the temperature within the manikin, as recorded by thermistor R-1, is a predetermined reference value. In this balanced condition, the bridge provides no alternating current signal at the junction of thermistor R-1 and resistor R-4. The positive bias at the base of transistor T-1 therefore remains unchanged and no alternating current signal is coupled to the base of transistor T-3, through the emitter follower circuit of transistor T-1 and the amplifier circuit of transistor T-2. The positive voltage at the emitter of T-3 therefore remains unchanged, at zero volts. In this condition there will be insufficient positive voltage at the emitter of transistor T-4 to gate on the silicon control rectifier T-5 and therefore no current flows through the heater circuit of resistor R-2.

When, however the temperature within the manikin falls below the reference value, the resistance of thermistor R-2 increass and an alternating current signal is superimposed upon the positive direct current potential at the base of transistor T-1. This signal is amplified in the circuits of transistor T-1 and transistor T-2 and fed to the base of transistor T-3. The signal is then phase detected in the circuit of transistor T-3 and filtered by C-6, appearing at the base of transistor T-4 as a positive D.C. voltage. This positive D.C. voltage is fed through the emitter follower circuit of transistor T-4 and appears at the gate of the silicon control rectifier T-5, turning the rectifier "on." This permits the flow of current through the heater resistor R-2 and recorder 16 until the temperature within the manikin reduces the resistance of thermistor R-1 and once again balances the bridge circuit 5. In this way, an accurate automatic record of the energy required to maintain manikin temperature within predetermined limits is obtained.

The switch S-1, when operated to a closed position, permits manual control of energization of the silicon control rectifier and the heater resistor R-2 at any time when it may be so desired.

It is to be understood that although circuitry for automatic control of the temperature at only one point within the manikin is specifically disclosed herein, a plurality of similar circuits for controlling and recording the energy required to maintain the predetermined temperature at a plurality of associated points within the manikin is specifically disclosed herein, a plurality of similar circuits for controlling and recording the energy required to maintain the predetermined temperature at a plurality of associated points within the manikin could be provided without departing from the spirit or scope of the present invention.

Obviously many modifications and variations of the present invention are possible in the light of the above teachings. It is therefore to be understood that within the scope of the appended claim, the invention may be practiced otherwise than as specifically described.

What is claimed is:
1. Apparatus comprising:
    (a) a garment fabricated out of a heat insulating material;
    (b) a manikin clothed in said garment;
    (c) a Wheatstone Bridge circuit including a thermistor, said thermistor being disposed within the manikin;
    (d) a heater element disposed within the manikin adjacent the thermistor;
    (e) a source of electrical energy;
    (f) a silicon control rectifier;
    (g) means for recording flow of current;
    (h) a circuit including in series the source of electrical energy, the silicon control rectifier, the current recording means and the heater element;
    (i) and means responsive to changes in the impedance of the thermistor for gating the silicon control rectifier.

References Cited
UNITED STATES PATENTS

| | | | |
|---|---|---|---|
| 898,610 | 9/1908 | Thomas | 73—192 |
| 1,011,607 | 12/1911 | Fulton | 324—71 X |
| 1,190,978 | 7/1916 | Bliss | 128—401 |
| 1,896,663 | 2/1933 | Collins | 219—201 X |
| 2,874,260 | 2/1959 | Huppert et al. | 219—504 |
| 3,007,026 | 10/1961 | Woodling | 219—504 X |
| 3,149,224 | 9/1964 | Horne et al. | 219—505 X |
| 3,256,734 | 6/1966 | Storke et al. | 73—193 |

RICHARD M. WOOD, *Primary Examiner.*

C. L. ALBRITTON, *Assistant Examiner.*